H. C. WARD.
EYEGLASSES.
APPLICATION FILED JULY 11, 1912.

1,070,756.

Patented Aug. 19, 1913.

WITNESSES:
M. A. Johnson.
W. E. Morton.

INVENTOR
Henry C. Ward,
BY
Wm. H. Campfield.
ATTORNEY

UNITED STATES PATENT OFFICE.

HENRY C. WARD, OF NEWARK, NEW JERSEY.

EYEGLASSES.

1,070,756.  Specification of Letters Patent.  Patented Aug. 19, 1913.

Application filed July 11, 1912. Serial No. 708,752.

*To all whom it may concern:*

Be it known that I, HENRY C. WARD, a citizen of the United States, residing at Newark, in the county of Essex and State of New Jersey, have invented certain new and useful Improvements in Eyeglasses; and I do hereby declare the following to be a full, clear, and exact description of the invention, such as will enable others skilled in the art to which it appertains to make and use the same, reference being had to the accompanying drawing, and to figures of reference marked thereon, which form a part of this specification.

This invention relates to a pair of eyeglasses in which the lenses are arranged to swing on a bridge so that they are alined and adapted to be placed in a suitable case or suspended by a cord.

The alinement or folding of the lenses is automatic when the eyeglasses are removed from the nose, the same springs that give pressure to the lenses to hold them on the nose also acting to swing the lenses together and thus fold the eyeglasses.

The invention further consists of certain details of construction to be hereinafter described.

The invention is illustrated in the accompanying drawing, in which—

Figure 1:
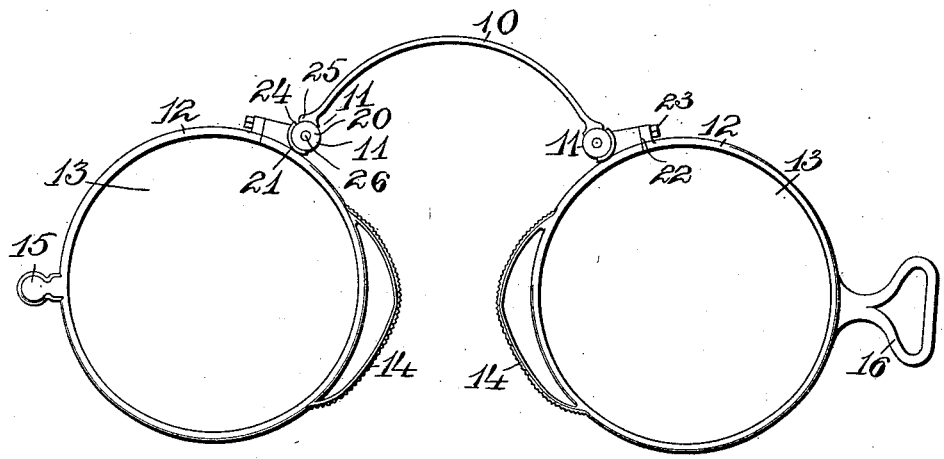
Figure 2:
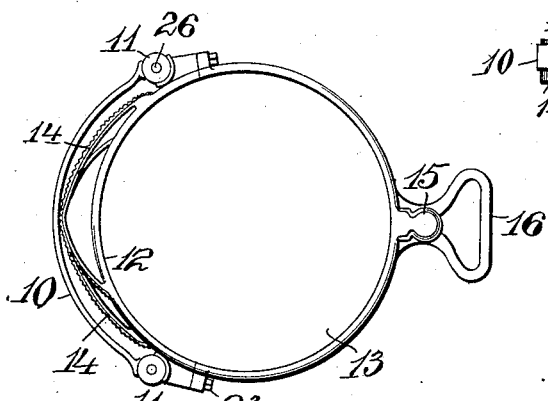
Figure 3:
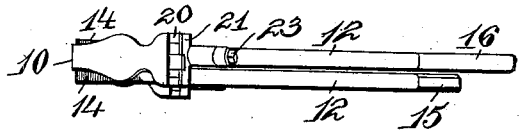
Figure 4:
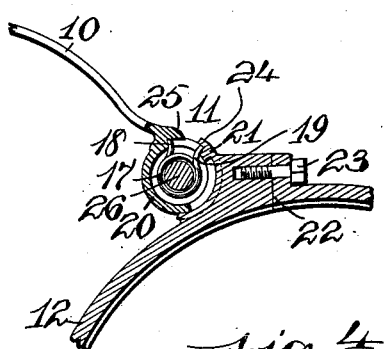

Figure 1 is a back view of the eyeglasses in position to go on the wearer's nose. Fig. 2 is a similar view, but showing the position the eyeglasses assume automatically when they are removed from the nose. Fig. 3 is a top view of the eyeglasses folded, and Fig. 4 is a section through one of the hinges.

The invention comprises a bridge 10 which is preferably made of material that is substantially rigid, and is usually formed with a bow, that is, having an arch. At the ends of the bridge are arranged hinges 11, which will be described in detail hereinafter, which connect, in swinging relation, the bridge with the lens rings 12, within which lens rings are arranged the lenses 13. The lens rings are provided with any form of clip 14 for providing enough friction for holding the lens rings on the nose of the wearer. It will be seen therefore that the lens rings can each swing independent of the other on the bridge so that the lens rings can be extended from each other as in Fig. 1, or they can be folded on top of each other as in Fig. 2, and for this reason the lenses are arranged in different planes so that when they swing together to the position shown in Fig. 3 they will lie side by side and be substantially alined. Suitable finger-pieces 15 and 16 can be attached to the lens rings for the purpose of attaching a tape or cord to one of the lens rings and for the purpose of providing projections by means of which the lens rings can be grasped to swing them apart so that the fingers do not mar or soil the lenses. The clips 14 are so disposed that they engage the arch of the bridge when the lens rings are swung inward so that they are alined, this being shown in Fig. 2, thus limiting the inward movement of the lenses toward each other. Within each hinge 11 I arrange a spring 17 which bears with one end 18 on the bridge and with the end 19 on the lens ring, this spring being so disposed that it acts to swing the lens on the bridge so that the lenses are forced toward each other, these springs giving enough pressure to cause the clips 14 to be bound against the nose of the wearer to hold the eyeglasses in place, the springs also acting to swing the lenses toward each other until they are alined, that is, to the position shown in Figs. 2 and 3. It will thus be seen that when the eyeglasses are being worn, the springs 17 hold the lenses in place and if the eyeglasses are lifted from the nose, for instance by the projection 16, as soon as the lenses clear the nose of the wearer, the lens that is not secured is swung inward toward the arch of the bridge, the bridge at the same time is being swung inward toward the lens that is being held in fixed position, and the eyeglasses fold up to the position shown in Fig. 2. This is a convenience by reason of automatically folding the eyeglasses for their insertion in a case provided for them, in short it makes a compact, small device as shown in Figs. 2 and 3.

Each hinge 11 is composed preferably of a casing 20, which casing coöperates with a barrel 21 on a lens ring 12, the barrel being adjacent to a split portion 22 which can be spread apart for the insertion of the lens into the ring and then tightly clamped by the screw 23. The edge 24 of the barrel 21 is adapted to engage the end 25 of the bridge 10 to limit the inward swing of the lens rings so as to prevent the springs from being unduly strained by an undue or extreme spreading apart of the lenses. A pintle 26 passes through the barrel 21 and the casing 20 to hold the members in pivotal relation.

Having thus described my invention, what I claim is:—

1. Eyeglasses comprising a rigid bridge, lens rings swinging on the bridge, springs so disposed that they normally cause the lens rings to swing toward each other, and means for limiting the inward swing of the rings when the rings are substantially alined.

2. Eyeglasses comprising a rigid bridge, lens rings swinging on the ends of the bridge, and springs to force the rings to the nose of the wearer and acting to swing the lens rings to a position side by side when the eyeglasses are removed from the nose.

3. Eyeglasses comprising a rigid curved bridge, lens rings arranged to lie side by side in the arch of the bridge, a pivotal connection between each ring and the bridge so that the rings can be swung apart, and springs acting on the bridge and the lenses to normally swing the lenses together.

4. Eyeglasses comprising a rigid arched bridge having hinge casings at its ends, lens rings, each lens ring being split to receive a lens, a barrel adjacent to the split portion to coöperate with the hinge casings to allow the lens rings to swing, and a spring in each hinge casing and acting on the casing and the barrel to normally swing the lens rings within the arch of the bridge, said lens rings swinging in different planes.

5. An eyeglass frame comprising a lens ring, a bridge, each lens ring being split, a hinge casing at the end of the bridge, a barrel on the ring and adjacent to the split portion, the barrel and casing being adapted to fit together so that the ring and bridge are pivoted together, and a spring in the hinge casing, the spring having its ends engaging the casing and the barrel to normally swing the bridge and ring toward each other.

In testimony, that I claim the foregoing I have hereunto set my hand this 9th day of July, 1912.

HENRY C. WARD.

Witnesses:
WM. H. CAMFIELD,
M. A. JOHNSON.

---

Copies of this patent may be obtained for five cents each, by addressing the "Commissioner of Patents, Washington, D. C."